United States Patent
Maddocks et al.

(10) Patent No.: US 12,406,256 B2
(45) Date of Patent: Sep. 2, 2025

(54) PARALLEL PROCESSING IN A NETWORK

(71) Applicant: MASTERCARD INTERNATIONAL INCORPORATED, Purchase, NY (US)

(72) Inventors: Ian David Alan Maddocks, Broughton (GB); Alan Johnson, Maldon (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 177 days.

(21) Appl. No.: 17/580,088

(22) Filed: Jan. 20, 2022

(65) Prior Publication Data

US 2023/0230083 A1 Jul. 20, 2023

(51) Int. Cl.
*G06Q 20/40* (2012.01)
*G06Q 20/02* (2012.01)
*G06Q 20/10* (2012.01)

(52) U.S. Cl.
CPC ......... *G06Q 20/401* (2013.01); *G06Q 20/027* (2013.01); *G06Q 20/10* (2013.01); *G06Q 20/403* (2013.01)

(58) Field of Classification Search
CPC .... G06Q 20/401; G06Q 20/027; G06Q 20/10; G06Q 20/403
USPC .......................................................... 705/75
See application file for complete search history.

(56) References Cited

U.S. PATENT DOCUMENTS

| | | | |
|---|---|---|---|
| 10,460,378 B1* | 10/2019 | Malinen | G06Q 20/405 |
| 2012/0330840 A1 | 12/2012 | Stinchcombe | |
| 2013/0151413 A1 | 6/2013 | Sears | |
| 2014/0258119 A1 | 9/2014 | Canis et al. | |
| 2017/0161742 A1* | 6/2017 | Martin-Bale | G06Q 20/02 |
| 2018/0183805 A1* | 6/2018 | Gonzalez Corona | G06Q 20/401 |
| 2018/0240121 A1* | 8/2018 | Szoke | H04L 9/3215 |
| 2018/0288063 A1* | 10/2018 | Koottayi | G06F 21/50 |
| 2020/0058030 A1 | 2/2020 | Adjaoute | |
| 2020/0302446 A1* | 9/2020 | Kledaras | G06Q 20/4093 |
| 2021/0406344 A1 | 12/2021 | Roberts | |
| 2022/0239733 A1* | 7/2022 | Maheshwari | H04L 67/142 |
| 2022/0261809 A1* | 8/2022 | Perkins | G06Q 20/12 |
| 2023/0306385 A1* | 9/2023 | Gadewar | G06Q 20/12 705/44 |

* cited by examiner

*Primary Examiner* — Courtney P Jones
(74) *Attorney, Agent, or Firm* — Jordan IP Law, LLC

(57) ABSTRACT

A network management system includes: a memory configured to store instructions; and a parallel processor configured to execute the instructions to: (a) receive a request for a transaction; (b) determine a first authorization decision for the request; (c) determine a second authorization decision for the request; and (d) perform a first procedure when the first authorization decision is different from the second authorization decision. The request corresponds to use of electronic payment for the transaction and wherein the first authorization decision is generated in parallel with generation of the second authorization decision.

20 Claims, 8 Drawing Sheets

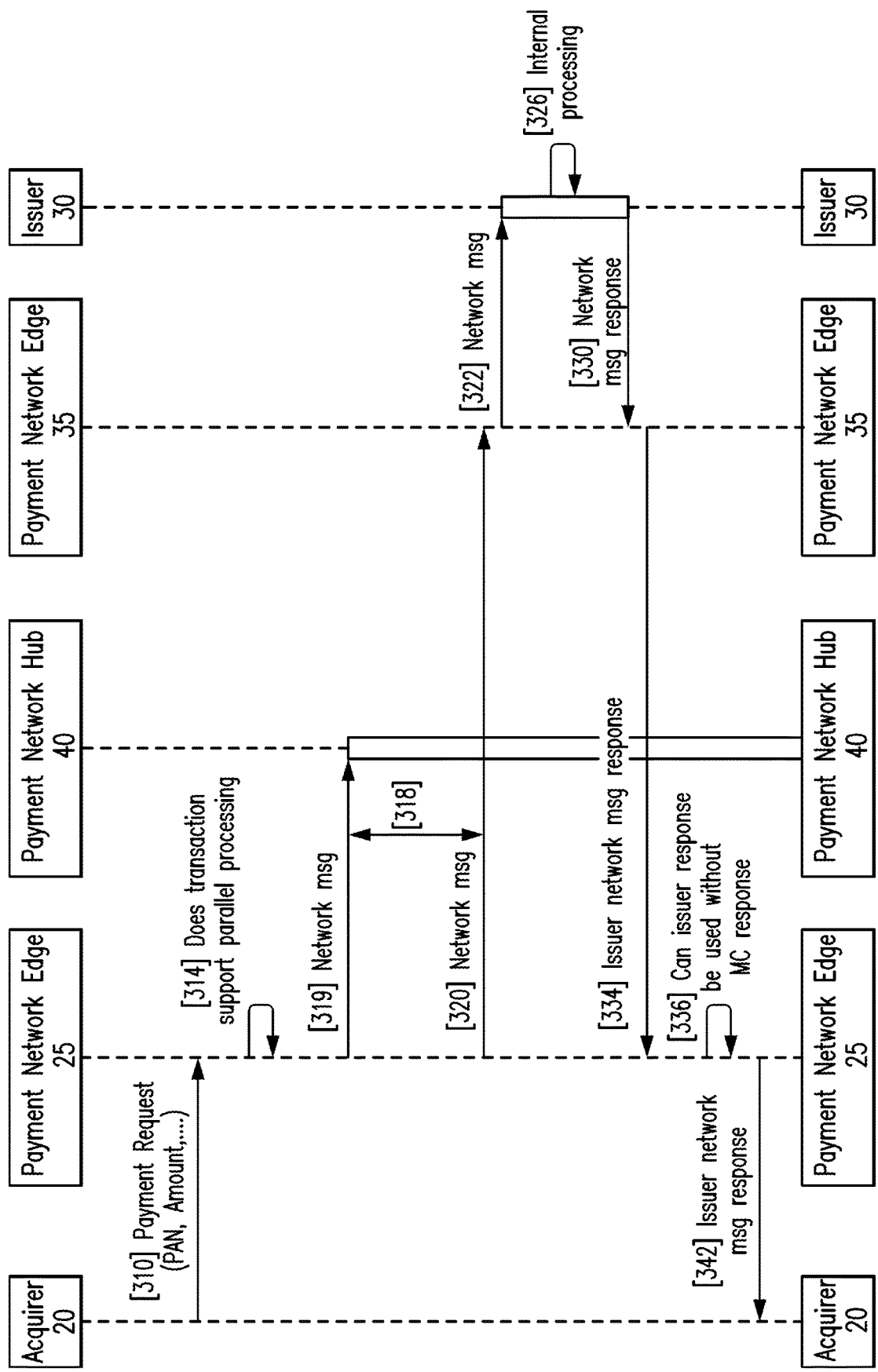

PARALLEL PROCESSING IN A NETWORK

FIELD

One or more embodiments described herein relate to performing processing of atypical concurrent operations in parallel.

BACKGROUND

Most payment transactions are attempted using some form of electronic payment. Because of fraud or account restrictions (e.g., insufficient funds, credit limits, etc.), electronic payments are processed by one or more participants in a financial network before the transactions are authorized. The time required to process a transaction on the network has increased significantly in the last decade, primarily because of the addition of centralized services by the payment network, resulting in the need to route data to each processing participant sequentially. For example, transactions initiated by a financial issuing bank need to be processed by a payment network edge service, a payment network hub services and finally the financial issuing bank, which causes delays and increases network load and traffic compared to a single participant having the sole role of authorizing the transaction. As a result, payment authorization is often a lengthy process which leads to customer dissatisfaction.

SUMMARY

An aspect of the present disclosure is drawn to a method for managing a network, including: receiving a request for a transaction authorization; determining a first authorization decision for the request; determining a second authorization decision for the request; and performing a first procedure when the first authorization decision is different from the second authorization decision, wherein the request corresponds to use of an electronic payment for the transaction and wherein the first authorization decision is generated in parallel with generation of the second authorization decision.

In some embodiments, the method further includes: transmitting the request to a first entity along a first signal path; and transmitting the request to a second entity along a second signal path, wherein the first signal path is independent from the second signal path to allow for the first authorization decision to be generated in parallel with generation of the second authorization decision.

In some embodiments, the first authorization decision is generated by an issuer of an account, and the second authorization decision is generated by a payment network hub. In some of these embodiments, the first authorization decision is an approval of the request, the second authorization decision is one of a decline or an alert for the request, and the first procedure includes initiating reassessment of the request by the issuer based on the second authorization decision of the payment network hub. In some of these embodiments, the initiating reassessment includes: updating the request with information generated by the payment network hub in rendering the second authorization decision; and transmitting the updated request to the issuer to generate a third authorization decision, wherein the first authorization decision generated by the issuer was performed without the information generated by the payment network hub included in the updated request. In some of these embodiments, the method is performed by an acquirer for the transaction placing the request on the network via a payment network edge connection point. In some of these embodiments, the payment network edge receives the first authorization decision and the second authorization decision in parallel from the issuer and the payment network hub, from which the payment network edge responds with a single consolidated decision In some other embodiments, the third authorization decision is different from the first authorization decision. In some of these embodiments, the third authorization decision matches the second authorization decision based on the reassessment.

In some embodiments, determining the first authorization decision is based on information received from an issuer in the network, and determining the second authorization decision is based on information received from a payment network hub.

In some embodiments, the first authorization decision corresponds to a first fraud risk, the second authorization decision corresponds to a second fraud risk, and the first fraud risk is different from the second fraud risk.

In some embodiments, the method further includes performing a second procedure when the difference between the first authorization decision and the second authorization decision corresponds to a second state different from the first state. In some of these embodiments, in the second state, the first authorization decision and the second authorization decision are approval decisions, and the second procedure includes notifying a buyer of the transaction that the electronic payment has been approved.

Another aspect of the present disclosure is drawn to a network management system, including: a memory configured to store instructions; and a parallel processor configured to execute the instructions to: (a) receive a request for a transaction; (b) determine a first authorization decision for the request; (c) determine a second authorization decision for the request; and (d) perform a first procedure when the first authorization decision is different from the second authorization decision, wherein the request corresponds to use of electronic payment for the transaction and wherein the first authorization decision is generated in parallel with generation of the second authorization decision.

In some embodiments, the first authorization decision is generated by an issuer, and the second authorization decision is generated by a payment network hub.

In some embodiments, the parallel processor is configured to: transmit the request to a first entity along a first signal path; and transmit the request to a second entity along a second signal path, wherein the first signal path is independent from the second signal path to allow for the first authorization decision to be generated in parallel with generation of the second authorization decision.

In some embodiments, the first authorization decision is approval of the request, the second authorization decision is one of a decline or an alert for the request, and the first procedure includes initiating reassessment of the request by the issuer based on the second authorization decision of the payment network hub. In some of these embodiments, the parallel processor is configured to initiate reassessment by: updating the request with information generated by the payment network hub in rendering the second authorization decision; and transmitting the updated request to the issuer to generate a third authorization decision, wherein the first authorization decision generated by the issuer was performed without the information generated by the payment network hub included in the updated request. In some of these embodiments, the third authorization decision is different from the first authorization decision. In some of these embodiments, the third authorization decision matches the second authorization decision based on the reassessment.

BRIEF DESCRIPTION OF THE DRAWINGS

FIG. 3A shows an embodiment of a method for processing network transactions.

DETAILED DESCRIPTION

Figure 1A:
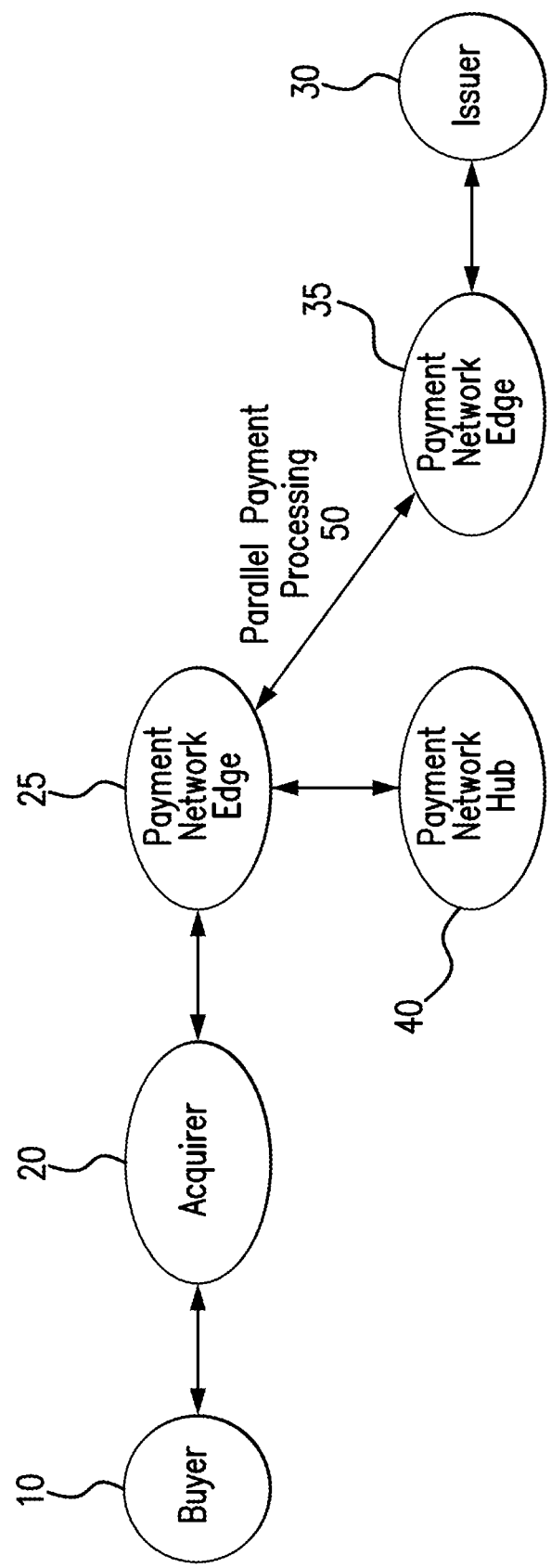
FIG. 1A shows an embodiment of a parallel payment network.

FIG. 1A shows an embodiment of a payment network 1 for processing financial transactions based on electronic payments. The payments may include credit card payments, debit card payments, and gift card payments, and in some cases tokenized payments such as, but not limited to, ones attempted using a mobile payment application or a digital wallet. Before the transactions are completed, several preconditions may be satisfied. One pre-condition includes authorizing the form of electronic payment which the buyer has selected to use in an attempt to pay for goods or services.

Referring to FIG. 1, the payment network 1 includes a buyer 10, an acquirer 20, an issuer 30, and a payment network hub 40. The buyer 10 is an entity attempting to purchase goods or services with an offered form of electronic payment. When the entity is a person (as opposed to a corporation or business), the buyer may be located at a store or other location of a merchant or service provider. In other cases, the buyer may use a device or computer for performing the transaction. For example, when the device is a smart phone, the phone may include a mobile payment application that is being used to attempt payment. In other cases, the phone may be used to access a website or an application to attempt payment. In other cases, the buyer device may be a tablet, notebook computer, or other terminal for making an online purchases.

In one embodiment, each of the acquirer 20, the payment network edge 25, the payment network hub 40, the payment network edge 35, and/or the issuer 30 may be understood to be interface processors in the sense that they a configured to cooperate with one another in order to manage payments and other tasks in the network. These interface processors may be provided by the owner of the payment network (e.g., by the credit card company) and/or may be included in or programmed into existing servers of the network participants for performing the operations of the embodiments described herein.

More specifically, the acquirer 20 may be implemented as a memory in conjunction with a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of acquirer in accordance with the embodiments described in the present disclosure. The memory of acquirer 20, as will be described in greater detail below, has instructions stored therein to be executed by acquirer 20 to permit acquirer to perform the operations described in more detail below.

Payment network edge 25 may be implemented as a memory in conjunction with a hardware processor such as a microprocessor, a multi-core processor, a single core processor, an FPGA, a microcontroller, an ASIC, a DSP, or other similar processing device capable of executing any type of instructions, algorithms, or software for controlling the operation and functions of acquirer in accordance with the embodiments described in the present disclosure. The memory of payment network edge 25, as will be described in greater detail below, has instructions stored therein to be executed by payment network edge 25 to permit acquirer to perform the operations described in more detail below.

Payment network hub 40 may be implemented as a memory in conjunction with a hardware processor such as a microprocessor, a multi-core processor, a single core processor, an FPGA, a microcontroller, an ASIC, a DSP, or other similar processing device capable of executing any type of instructions, algorithms, or software for controlling the operation and functions of acquirer in accordance with the embodiments described in the present disclosure. The memory of payment network hub 40, as will be described in greater detail below, has instructions stored therein to be executed by payment network hub 40 to permit acquirer to perform the operations described in more detail below.

Payment network edge 35 may be implemented as a memory in conjunction with a hardware processor such as a microprocessor, a multi-core processor, a single core processor, an FPGA, a microcontroller, an ASIC, a DSP, or other similar processing device capable of executing any type of instructions, algorithms, or software for controlling the operation and functions of acquirer in accordance with the embodiments described in the present disclosure. The memory of payment network edge 35, as will be described in greater detail below, has instructions stored therein to be executed by payment network edge 35 to permit acquirer to perform the operations described in more detail below.

Issuer 30 may be implemented as a memory in conjunction with a hardware processor such as a microprocessor, a multi-core processor, a single core processor, an FPGA, a microcontroller, an ASIC, a DSP, or other similar processing device capable of executing any type of instructions, algorithms, or software for controlling the operation and functions of acquirer in accordance with the embodiments described in the present disclosure. The memory of issuer 30, as will be described in greater detail below, has instructions stored therein to be executed by issuer 30 to permit acquirer to perform the operations described in more detail below.

The acquirer 20 may be a merchant or provider of goods or services and/or an associated processing system providing payment services to the merchant or provider of goods or services. For example, when an in-store purchase is being attempted, the acquirer 20 may include a point-of-sale terminal connected to a processing system configured (e.g., through appropriate software, network settings, encryption, etc.) to communicate with and perform various operations within the payment network. When an online purchase is attempted, the acquirer 20 may be a processing system operating on a server hosting a web site offering the goods or services to be purchased. In this case, the buyer may be attempting purchase using a shopping cart application (or other application programming interface) designed to receive electronic payment information (e.g., credit or debit card number, tokenized payment information, etc.) and interoperate with the payment network for completing transactions.

To operate within the payment network, the processing system (and/or an interface processor coupled to the processing system) of the acquirer 20 may be provided by and/or programmed to interoperate with the payment network hub and issuer. In accordance with one or more embodiments, this may be accomplished by applying a parallel processing model to exchange messages (and/or other information) to confirm authorization of the electronic payment from the buyer. In such a case, the processing system (and/or interface processor) of the merchant may be considered to be one of the initiating stages for processing transactions in parallel, as described in greater detail below.

In one embodiment, the processing system of the acquirer may be coupled to the payment network through an interface processor of the acquirer. In other embodiments, the processing system and interface processor functionality may be incorporated within a single processor/processing system of the acquirer. Thus, in some cases, use of the term "acquirer" may refer to both the processing system (e.g., merchant payment processing system) and an interface processor to the network. In other cases, the term "acquirer" may refer to a processing system coupled to the interface processor of the acquirer. Examples are discussed below. (The acquirer may be named as such because it receives the payment information of the buyer from a point-of-sale terminal, shopping cart application, smart phone application, or other type of payment as described herein.)

The issuer 30 may include the processing system of the financial institution which issued the buyer an account corresponding to the electronic form of payment presented for the transaction. Examples of the issuer 30 include the processing system of a bank, credit union, or other participant in the payment network that issued a credit card or debit card to the buyer. In one embodiment, the issuer 30 may correspond to the processing system of another type of entity which has allocated an account to the buyer that is being used as payment which the acquirer has deemed acceptable for transactions. The processing system of the issuer 30 may perform various operations including those for authorizing the form of payment by the buyer.

The payment operations may include, for example, those used to implement security measures to authenticate the buyer and the account being used for the transaction. Additional operations may include those used to confirm the payment amount as being within an acceptable range given the account and past buyer activity (e.g., given any outstanding or carried-forward balances, alerts, credit history, etc.). Additional operations may include those performed to assess whether the issuer 30 has been associated within any fraudulent or other suspicious activity (which may figure prominently especially for online transactions). Still other operations include any of those used to detect any other type of fraud that may be associated with the transaction and/or the electronic form of payment being presented for authorization by the buyer.

In one embodiment, the processing system of the issuer 30 may be coupled to the payment network through an interface processor of the issuer 30. In other embodiments, the processing system and interface processor functionality may be incorporated within a single processor/processing system of the issuer 30. Thus, in some cases, use of the term "issuer" may refer to both the processing system (e.g., bank payment processing system) and an interface processor to the network. In other cases, the term "issuer" may refer to a processing system coupled to the interface processor of the issuer 30. Examples are discussed below.

The payment network hub 40 may be the financial entity from which the issuer 30, via the payment network edge 35, obtained and manages the electronic form of payment on behalf of the buyer. The payment network hub 40 may manage the payment processors or their attendant operations performed throughout the payment network.

In one non-limiting embodiment, the payment network hub 40 may include a controller at a central hub of the payment network of a credit/debit card company or the payment network hub 40 may be distributed access multiple sites (providing services locally and/or redundancy). The payment network hub 40 may be programmed to process transactions by performing payment processing and authorization algorithms independent from similar or different algorithms implemented by the issuer 30. The payment network hub 40 may perform these algorithms in parallel with the payment processor of the issuer 30 in order to (1) increase the speed of authorization (or decline) of the form of payment attempted by the buyer for the transaction and (2) provide oversight of the issuer 30 especially in cases where the issuer 30 has authorized the electronic payment but the authorization algorithm performed by the payment network hub indicates a different authorization decision. The different result may be a decline or an alert indicating, for example, that an additional inquiry may be warranted by the issuer 30 prior to final authorization being returned to the acquirer 20 via the payment network edge 25. In one embodiment, the different authorization decision may reflect a different level of fraud risk detection algorithms, available by visibility of all transactions not just those of a single issuer and/or more capability to decode cryptographically secured transactions, than used by the issuer 30. In this way, one or more embodiments described herein may be considered to implement a parallel architecture 50 for processing payments, where both payment network hub 40 and the issuer 30 are processing the transaction simultaneously, at least in respect to operations that are to be performed for authorizing (or approving) or declining those payments.

Figure 1B:
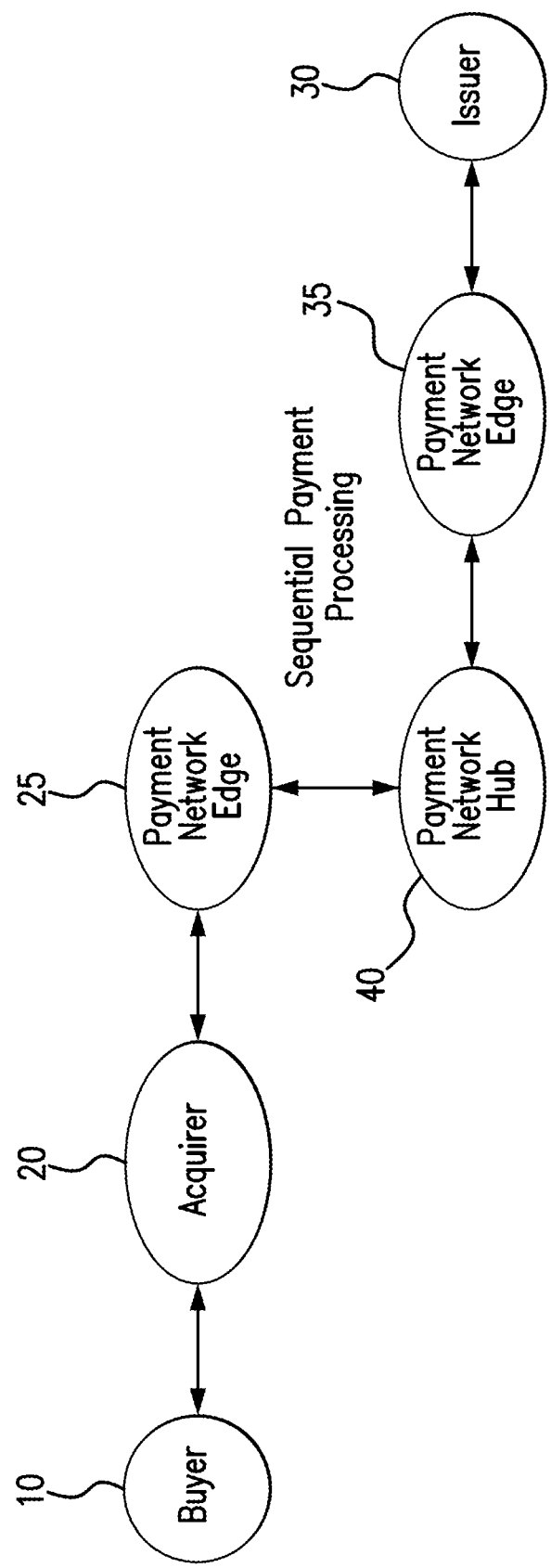
FIG. 1B shows an embodiment of existing sequential processing

Unlike other payment models, see FIG. 1B, where financial transactions are processed sequentially among various network participants, the processing architecture of payment network 50 performs authorization operations simultaneously (e.g., in parallel) to determine whether an electronic payment attempted for a transaction should be approved or declined.

In one embodiment, the payment network edge 25 may be programmed to serve as an initial stage for processing payments in parallel in the network. For example, the acquirer may be triggered in response to notification (e.g., from a point-of-sale terminal, shopping cart application, mobile payment application, etc.) that a transaction is being attempted by an electronic form of payment compatible with the network. Once triggered, the acquirer sends message to payment network edge 25 and the payment network edge 25 sends messages in parallel to both the issuer 30, via the payment network edge 35 and the payment network hub 40 and then the issuer 30 and payment network hub 40 generate authorization decisions in parallel. This represents a substantial departure from the inefficiencies of other models, where, for example, the acquirer 20 messages the payment network hub 40 via the payment network edge 25, which would then message the issuer, via the payment network edge 35, which would then send a message back to the payment network hub 40, via payment network edge 35 which would then send a decision back to the acquirer 20, via payment network edge 25, authorizing or declining payment.

Once the payment request is received, the issuer 30 and the payment network hub 40 initiate algorithms (e.g., business logic and policies relating to fraud or other stand-in services) independently from one another to generate separate authorization decisions. The response from the payment network hub 40 may be considered advice in such cases wherein the payment network hub 40 does not decline unilaterally. However, there are cases wherein the issuer 30 may configure the payment network hub 40 to decline. As explained below, the parallel processing architecture will include oversight function (e.g., by the payment network edge 25) which is triggered when the authorization decision from the payment network hub 40 recommends reevaluation by the issuer 30. Where there is a discrepancy (e.g., in cases where the issuer 30 generates an approval decision and the payment network hub 40 generates a reevaluation advice decision or at least one which provides an alert indicating that there may be substantial fraud risks), a reassessment operation may be performed to have the issuer 30 perform an additional authorization check for the transaction which includes additional data provided from the payment network hub 40.

By processing authorization of payment requests in parallel, one or more embodiments described herein may achieve the advantages of edge routing processing while at the same time allowing for centralized processing of financial transactions. This may significantly increase the speed of processing transaction authorizations, for example, by routing back to the acquirer the decision without the delays associated with the sequential processing performed by other payment networks, this delay is compounded when there are large geographical distances between each party. At the same time, the parallel processing architecture described herein adds an extra layer of protection through an oversight function performed by the payment network hub 40 in parallel with operations performed by the payment network edge 25 for the same transaction.

Figure 2:
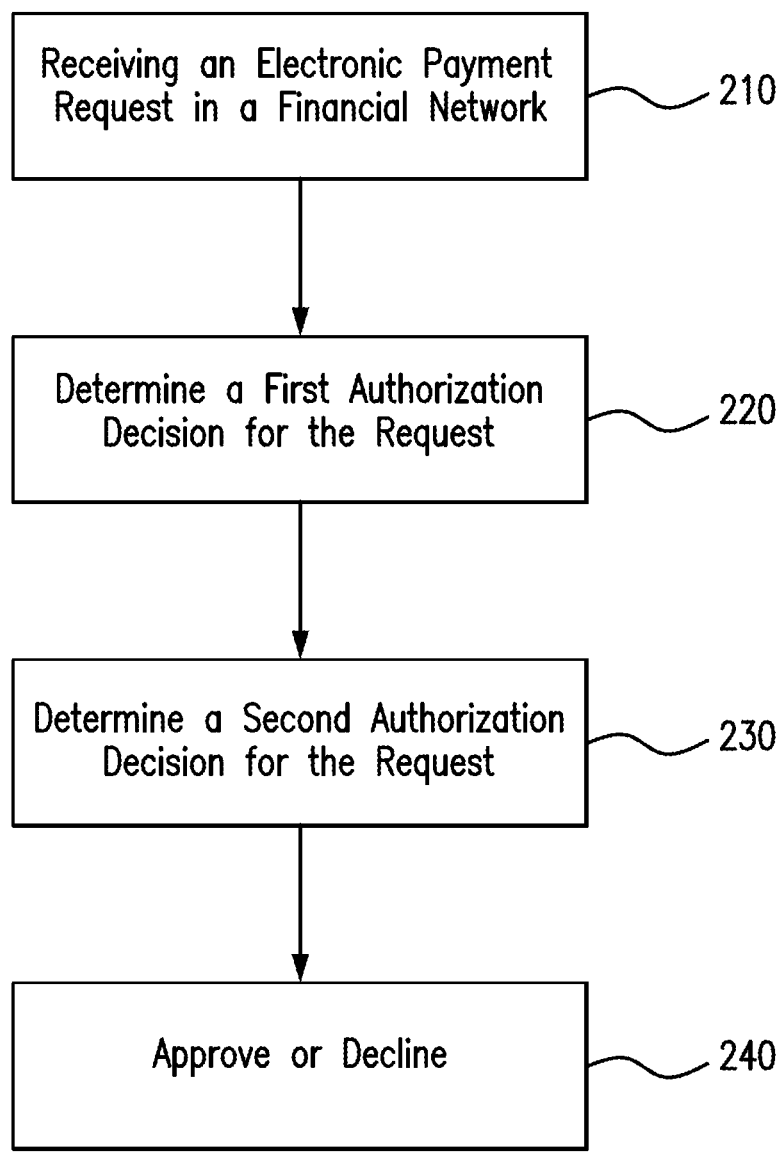
FIG. 2 shows an embodiment of a method for processing network transactions.

FIG. 2 shows operations included in an embodiment of a method for processing transactions in a financial network, which, for example, may be the payment the payment network of FIG. 1 or a different network. The following operations may be performed, for example, by the acquirer or may be performed based on, or in combination with, another network entity. For illustrative purposes, the method will be described as being performed by the payment network edge 25 in accordance with the network of FIG. 1.

Referring to FIG. 2, the method includes, at 210, receiving an electronic payment request for a transaction. The request may correspond to any of the types of electronic payments described herein.

At 220, a primary authorization decision is determined for the request. The primary authorization decision may correspond to a decision of the issuer 30 (e.g., bank) generated using internal fraud risk and/or other types of algorithms (logic), absent of any data from secondary sources, such as the payment network. This authorization may be determined by the payment network edge 35 through the parallel processing features of the network.

At 230, a secondary authorization decision is determined for the request. The secondary authorization decision may correspond to a decision of the payment network hub 40 (e.g., credit card company) generated using internal fraud risk and/or other types of algorithms (logic). The algorithms used by the payment network hub 40 may be similar to or different from the algorithms used by the issuer and/or may take different types of data into consideration when performing their internal authorization assessments. These authorization decisions are generated in parallel and may be determined by the acquirer. In addition, in one embodiment the payment network hub 40 may not receive or process the authorization decision of the issuer 30, but rather the authorization comparisons may be performed by a different entity, e.g., the acquirer. In other embodiment more than a single secondary source may be configured, such as Equifax providing advice on the consumer, and/or a government agency providing confirmation of data or approval to proceed.

At 240, the authorization is either approved or declined. There are two general options for determining whether authorization is either approved or declined in accordance with aspects of the present disclosure, as will be described in greater detail below. In general, In one example embodiment, if the issuer 30 declines, the result of the payment network hub 40 is unimportant and the response from payment network hub 40 to the acquirer 20 is decline. In another example embodiment, the issuer 30 is inclined to decline payment unless there is strong evidence, i.e., data, to justify a review by payment network hub 40. In such embodiments, the issuer 30 may respond with a 'decline unless Payment Network response is to request a review upon Issuer decline."

FIG. 3A shows an embodiment of a method for processing transactions in a financial network. The method includes performing parallel processing of electronic payment requests for online and point-of-sale transactions prior to completion of the transactions. The parallel processing includes operations that are performed in parallel (or simultaneously) by an issuer 30 and the payment network hub 40, which, for example, may be located at a centralized payment network hub.

In one embodiment, a controller of the payment network hub 40 implements a payment authorization algorithm in parallel with implementation of a payment authorization algorithm by an interface processor of an acquirer. Through this parallel processing architecture, faster processing speeds may be attained which will benefit of all network participants and the buyer. For purposes of illustration, the method may be performed by the system embodiments described herein or may be performed by a different system.

The method may be performed based on communicating information among the acquirer 20, payment network edge 24, payment network hub 40, payment network edge 35, and issuer 30. In this embodiment, the acquirer 20 may be a processing system of a merchant which is coupled to a point-of-sale terminal in a store or shopping cart application or other application programming interface for receiving account information offered as electronic payment by a buyer for goods and services. The payment network edge 25 may couple the acquirer to the payment network. The payment network edge 35 of the issuer may couple a processing system of the issuer 30 to the payment network, which, for example, may be the financial institution which issued the account to a buyer. For example, when the payment request is in the context of using a credit or debit card, the acquirer may be a bank and the payment network edge 40 may correspond to the credit card company.

The payment network edge 25 of the acquirer 20 and the acquirer 20 are shown to be separate in this embodiment. Similarly the payment network edge 35 of the issuer 30 and the issuer 30 are shown to be separate in this embodiment. However, in other embodiments, the payment network edge 25 of the acquirer 20 and the acquirer 20 may be incorporated into a same server or other device. Similarly, in other embodiments, the payment network edge 35 of the issuer 30 and the issuer 30 may be incorporated into a same server or other device. For purposes of illustration, the following embodiments will be explained in the example where payment network hub 40 corresponds to a credit card company.

Referring to FIG. 3A, the method includes, at 310, the acquirer 20 receiving an electronic payment request from a buyer. The electronic payment request is made pursuant to a transaction where the buyer is attempting to purchase goods or services with a credit card. In such as case, the acquirer may be the point-of-sale (POS) terminal of a store or an shopping card or other payment application in the case where the purchase is being attempted online, e.g., through a web site, smart phone application, etc.

One the electronic payment request is received by the acquirer 20 (e.g., by inserting the card into the POS terminal or entering the account information online), the request is sent to the payment network edge 25 of the acquirer 20. The request may include information relating to the transaction that is to be used in authorizing (or declining) the payment request. For example, the request may include a primary account number (e.g., PAN, or credit card number), a card security code (e.g., CVV2), card expiration date, zip code, the amount of the transaction, an encoded personal identification number (PIN), an identifier of the merchant (acquirer), and any other information relating to the transaction that is to be considered by the participants in the payment network for rendering a decision.

In one embodiment, the payment request may include all or a subset of the following types of information: Transaction ID, Account ID (anonymized), Merchant ID, Transaction Amount, Transaction Local Currency Amount, Date of Transaction, Time of Transaction, Type of Transaction, Date of Processing, Cardholder Present Code Merchant Category Code (MCC)), Account Information (e.g. Account ID (anonymized), Card Group Code, Card Product Code, Card Product Description, Card Issuer Country, Card Issuer ID, Card Issuer Name, Aggregate Card Issuer ID, Aggregate Card Issuer Name), Merchant Information (e.g. Merchant ID, Merchant Name, MCC/Industry Code, Industry Description, Merchant Country, Merchant Address, Merchant Postal Code, Aggregate Merchant ID, Aggregate Merchant Name, Merchant Acquirer Country, Merchant Acquirer ID), and Issuer Information (e.g. Issuer ID, Issuer Name, Aggregate Issuer ID, Issuer Country).

At 314, the payment network edge 25 of the acquirer 20 receives the electronic payment request and determines whether the electronic payment request is for a transaction that supports parallel processing. This determination may be made in a variety of ways. For example, if the electronic payment is a credit-based payment, then payment network edge 25 may indicate that the payment request supports parallel processing in the network. If the electronic payment is a different kind of payment (e.g., a tokenized card-based payment such as, but not limited to, Apple Pay), then the interface processor of the acquirer may determine that the electronic payment request does not support parallel processing. In other embodiments where the transaction is tokenized, the payment network edge 25 may have the capability to detokenized locally or call services other than the payment network hub 40 to detokenize and therefore perform the transaction authorization in parallel as if not tokenized.

Electronic Payment Request Supports Parallel Processing

At 318, when the payment network edge 25 of the acquirer 20 determines that the electronic payment request supports parallel processing, payment network edge 25 transmits two messages. The first message 319 includes information corresponding to the electronic payment request to the payment network hub 40. The second message 320 includes information corresponding to the electronic payment request to the payment network edge 35 of the issuer 30, the order is unimportant. Both messages are transmitted in parallel through different network paths.

The information embedded in the first message 319 and transmitted to the payment network hub 40 may be the same information embedded in the second message 320 transmitted to the payment network edge 35 of the issuer 30. In some cases, the two messages may have overlapping information but there may be some differences, for example, based on the specific types of algorithms which are used by the payment network hub 40 and the payment network edge 35 of the issuer 30 to perform payment request authorization. It should be further noted that message 320 may differ somewhat from message 319, as message 320 may additionally details on why the payment network hub 40 recommend reevaluating, such as: there may have been an increased concern of fraud from this merchant or geographic region; there may be a concerning observation on the payment request such as omitted or invalid data; and whether a 3D Secure step-up is recommended, where consumer authentication is also recommended.

In one embodiment, payment network hub 40 may process the information in message 319 and may store this information for performing various operations. The information may also be archived for billing purposes and/or to determine network management efficiency and for performing management-related operation within the payment network.

Once the messages 319 and 320 are transmitted in parallel, the payment network edge 25 of the acquirer 20 may wait for a response from at least one of the payment network hub 40 or the payment network edge 35 of the issuer 30 before taking further action relating to the transaction.

At 322, the payment network edge 35 of the issuer 30 transmits information included in the second message 320 to the issuer 30. For example, when payment network edge 35 is included as instructions in a server hosted by the issuer 30, the payment network edge 35 may transmit information in message 320 to a computer (or other processing) system of the issuer 30 through the payment network or through a cloud of the issuer coupled to the payment network.

At 326, once the message from the payment network edge 35 is received, issuer 30 executes a transaction processing algorithm. This algorithm (e.g., the issuer's business logic) may include checking whether the payment request is from a valid buyer and determining whether the request is to be authorized or flagged for decline. The business logic used to implement the algorithm may be different depending on the policies of each issuer and/or the payment network in which the issuer 30 is named as a participant. For example, different banks (as issuers) may have different policies concerning fraud monitoring and protection. Also, different payment networks (e.g., credit card company networks) may have different policies to be implemented for authorizing or declining electronic payment requests.

In some cases, for example, the validity check may involve comparing the credentials of the credit card account number against stored information such as the name of the account holder representing himself as buyer, and checking the security code and expiration date as indicated in an account holder database. The information to be checked may be incorporated within message 322, for example, as an encrypted datagram. If any of this information is inconsistent or is otherwise not determined to be valid, then an alert may be generated which declines the payment request. These operations may be included as part of a fraud monitoring and detection algorithm performed by the issuer 30.

In addition to checking the information in the datagram, the processing system of the issuer 30 may detect unusual spending, excessive and atypical spending, impossible spending patterns i.e., Buying a coffee in NY and cloths in LA within 1 hour of each other. With respect to MDES, this issuer could raise their alerts if the account was tokenized onto multiple wallets, thereby exposing the account to increased activity, in a short timeframe. Additionally, the issuer 30 may cache account details of the buyer in the event the same transaction is to be reassessed in accordance with subsequent operations of the method, described below.

At 330, the issuer 30 transmits a response message back to the payment network edge. The response message includes the decision generated by the issuer 30 indicating whether the payment request was authorized or declined.

At 334, the payment network edge 35 transmits information contained in the response message from the issuer 30 to the payment network edge 25 of the acquirer 20. As with most of the messages transmitted in the payment network, the response message may be encrypted for privacy and security purposes.

At 338, the payment network edge 25 used by the acquirer 20 performs an inquiry to determine whether the decision contained in the issuer response message 330 should be sent to the acquirer 20 without waiting for feedback from the payment network edge 35. This inquiry may include determining whether the decision in the issuer response message indicates that the payment request for the transaction has been declined. In other embodiments the decision of the issuer 30 maybe more refined, to be either: 1) decline immediately, therefore without concern to other decision sources; or 2) perform reassessment if payment network provides a high confidence, sometimes known as a Risk Score otherwise decline.

At 342, when the decision indicates the payment request has been declined, the payment network edge 25 of the acquirer 20 need not wait for feedback from the payment network edge 35 and may send a message to inform the acquirer 20 (and thus the buyer) that the payment request has been denied. This may end the transaction at least in respect to use of the type of electronic payment offered by the buyer for purchasing the goods and services. The buyer may then have the option to present an alternative form of payment if the goods or services are still desired to be purchased. The alternative form of payment may include another type of electronic payment. If so, the operations of the method may be re-executed based on a new payment request. Otherwise, processing of the transaction is terminated.

Figure 3B:
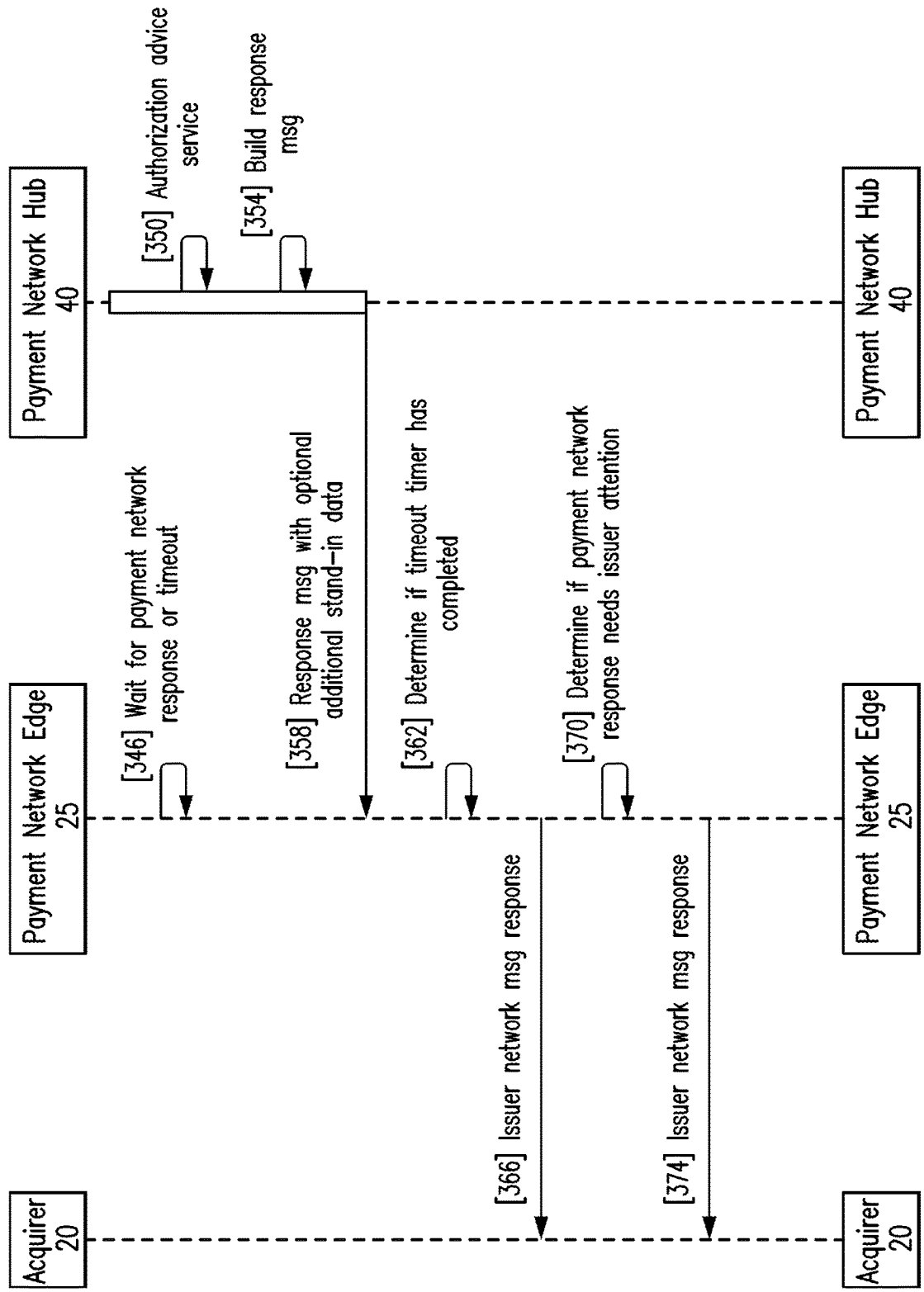
FIG. 3B shows an embodiment of a method for processing network transactions.

FIG. 3B recites additional operations which may be included in an embodiment of a method for processing transactions in a financial network. The additional operations set forth in FIG. 3B may be a continuation of the method of FIG. 3A or may be implemented independently from the method of FIG. 3A. For illustrative purposes, it will be assumed in the following discussion that the operations in FIG. 3B are a continuation of the method of FIG. 3A.

Referring to FIG. 3B, if the processing system of the issuer 30 has authorized the payment request, then, at 346, the payment network edge 25 of the acquirer 20 will wait to send a response to the acquirer 20 (e.g., POS terminal, website, application, etc.). The wait time may be set in various ways. For example, the wait time may be period of time until feedback is received from the payment network edge 40.

In another embodiment, the wait time may be determined by a timer, e.g., when the decision from the issuer 30 indicates that the payment request has been authorized, a time of the payment network edge 25 may be started. The timer may be said to count down from a predetermined time. When the timer counts out, the payment network edge 25 of the acquirer 20 may performed various operations depending on whether feedback was received from the payment network edge 40 before the timer expires. In this way, the timer may serve to improve the efficiency of processing the transaction. In further embodiments the wait time will be extended when the payment network is under high load such as peak shopping seasons, or allow the payment network to response with a limited number of wait requests.

At 350, as the timer counts down, the payment network hub 40 may perform various operations in processing the electronic payment request that it received in accordance with message 319. For example, the payment network hub 40 may perform stand-in services including fraud monitoring. The type of fraud monitoring performed by the payment network hub 40 may be the same or different from the type of fraud monitoring performed by the payment network edge 35 of the issuer 30.

In one embodiment, the payment network hub 40 may determine (as a result of fraud monitoring logic) that there is a potential for fraud relating to the transaction. This may occur, for example, when the type(s) of fraud monitoring operations performed by the payment network hub 40 are different from those performed by the payment network edge 35 of the issuer 30. For example, the payment network hub 40 may considered information or parameters that are not available to (or otherwise which are not taken into consideration by) the payment network edge 35 of the issuer 30 when performing its fraud monitoring operations. In such a case, the outcome of fraud monitoring performed by the payment network hub 40 may be different from the outcome of the fraud monitoring performed by the payment network edge 35.

For example, in some cases the issuer 30 may authorize the payment request but the payment network hub 40 may decline the request or otherwise indicate that there are one or red flags (e.g., problems) that may prevent immediate authorization and thus requires further inquiry. In such a case, the payment network hub 40 may generate an alert that an additional re-assessment should be performed by the issuer 30.

With respect to fraud monitoring, the payment network has a view wider than just the single issuer, and therefore can detect: if a merchant or small geographically area is being hit by fraudulent transaction attempts from a range of issuers' accounts; and by economy of scale invest in more complex fraud detection capabilities (AI for example) that would be too expensive for small issuers to purchase. Further, in some embodiments, the issuer 30 may configure payment network hub 40 to perform cryptographic validation (EMV or Mag Stripe), which would save the issuer 30 from investing in such services.

At 354, the payment network hub 40 may generate a response message based on the results of the stand-in services performed. The response message includes the decision generated by the payment network hub 40 as to whether the payment request was authorized or declined. In one embodiment, additional information may be included in the response message. The additional information may include, for example, stand-in data, if any. The stand-in data may include an advice response, e.g., whether there was no issue found or whether issues were found. Further, if issue(s) are found, the response message may include information regarding the test that failed with an optional risk score. The issuer 30 might view a single issue with a low score as acceptable but multiple issues with low scores passing a threshold that results in a decline by the issuer 30.

At 358, the payment network hub 40 transmits the response message to the payment network edge 25 of the acquirer 20.

At 362, the payment network edge 25 of the acquirer 20 determines whether the response message from the payment network hub 40 has arrived before the timer has timed out.

At 366, if the timer expires before the payment network edge 25 receives the response message from the payment network hub 40, then the payment network edge 25 may transmit a message to the acquirer 20 indicating that there was an error in processing the payment request. In this case, the acquirer 20 may, for example, display an error message on the POS terminal or one the web site or device application to inform the buyer that authorization for the payment request failed or otherwise was not completed. At this point, the transaction may be terminated, at which time the buyer may attempt the transaction again using the same payment card or use another form of payment to purchase the goods or services.

At 370, the payment network edge 25 of the acquirer 20 receives a response message from the payment network hub 40 before the timer expires. In this case, the payment network edge 25 of the acquirer 20 determines whether this response message contains a decision from the payment network hub 40 authorizing the payment request.

At 374, if the response message from the payment network hub 40 authorizes the payment request, the payment network edge 25 of the acquirer 20 may transmit a message to the acquirer 20 notifying the acquirer that the payment request has been authorized and the transaction may be completed.

Figure 3C:
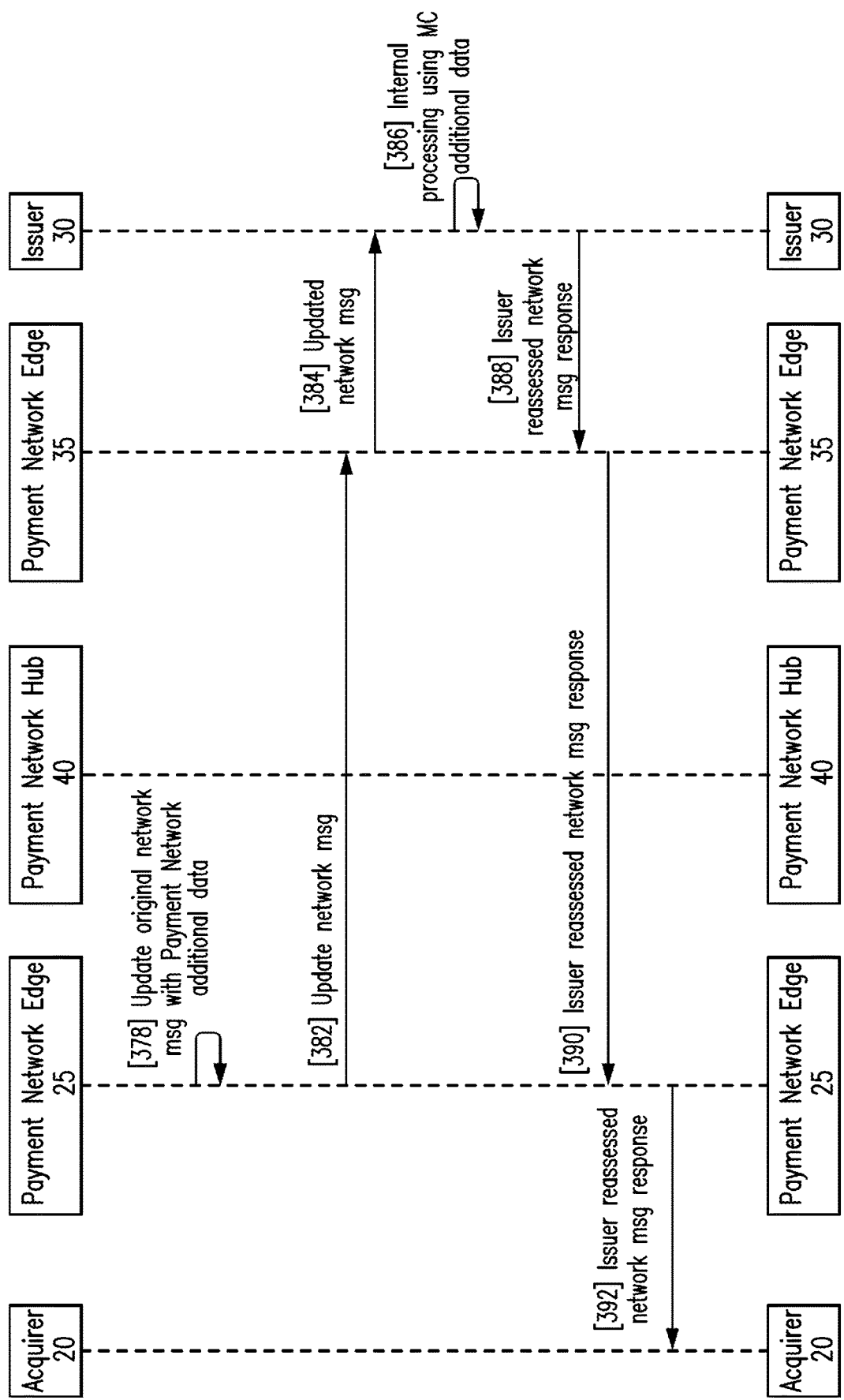
FIG. 3C shows an embodiment of a method for processing network transactions.

FIG. 3C recites additional operations which may be included in an embodiment of a method for processing transactions in a financial network. The additional operations set forth in FIG. 3C may be a continuation of the method of FIG. 3B, or may be implemented independently from the methods of FIGS. 3A and/or 3B. For illustrative purposes, it will be assumed in the following discussion that the operations in FIG. 3C are a continuation of the method of FIG. 3B.

Referring to FIG. 3C, the payment network edge 25 of the acquirer 20 receives a response message from the payment network hub 40 before the timer expires. The payment network edge 25 of the acquirer 20 then determines whether this response message contains a decision from the payment network hub 40 authorizing the payment request. However, in this case the response message does not authorize the payment request.

Instead, the response message from the payment network hub 40 indicates that there is an issue (or red flag) preventing immediate authorization of the payment request, and that therefore the issuer 30 should perform a reassessment of its decision to authorize the payment request). Thus, the payment network edge 25 of the acquirer 20 may not send the same type of message to the acquirer 20 as was sent in operation 342. Rather, in this case the following operations may be performed.

At 378, the payment network edge 25 of the acquirer 20 generates an updated payment request which, for example, may correspond to an updated version of the original message for the payment request (e.g., message 320) transmitted in operation 318. The updated payment request may include the same information in the original message and may also include additional information determined by the payment network edge 25 during its assessment of the payment request. This additional information may include, for example, data and/or notifications determined that raised the red flag for the original payment request.

At 382, the payment network edge 25 of the acquirer 20 transmits the updated payment request to the payment network edge 35 of the issuer 30. This message may be transmitted along a signal path that bypasses the payment network hub 40.

At 384, the payment network edge 35 of the issuer 30 transmits the updated payment request to the issuer 30.

At 386, the issuer 30 (e.g., the bank or other financial institution which issued the card or account of the payment network that has been offered for payment) processes the updated payment request using, for example, the same algorithm-based policies and rules which this processing system used to assess the original payment request. However, this time, because the updated payment request includes the additional information generated by the payment network edge 25 when it performed its assessment of the original payment request, the issuer 30 may or may not generate a different decision (approve or decline) than was originally rendered.

The payment network may provide details on, for point of sale (POS) based transactions: cryptographic validation of the mag stripe; emv chip; and contactless cryptograms. For e-commerce transactions, the payment network may provide details on: cryptographic validation, if supported; and Step-Up results following 3D Secure consumer/buyer validation. For risk-based score knowing, the payment network may provide details on: the area's level of fraud or attacks the acquirer 20 may be currently under; biometric data from the POS or consumer mobile device; and risk data from the device or electronic wallet on the device.

At 388, once a decision is rendered for the updated payment request (as a result of the reassessment), the issuer 30 may transmit a reassessment response message to the payment network edge 35 of the issuer 30.

At 390, the payment network edge 35 of the issuer 30 may transmit the reassessment response message to the payment network edge 25 of the acquirer 20, once again along a signal path which bypasses the payment network hub 40.

At 392, the payment network edge 25 of the acquirer 20 transmits the decision included in the reassessment response message to the acquirer 20. The acquirer 20 (e.g., a processing system of the merchant) may then generate a notification (e.g., on a POS terminal, shopping cart application on a web site, mobile payment application, etc.) indicating whether the reassessed decision indicates approval or decline of the payment request for the attempted transaction.

Electronic Payment Request does not Support Parallel Processing

Figure 4:
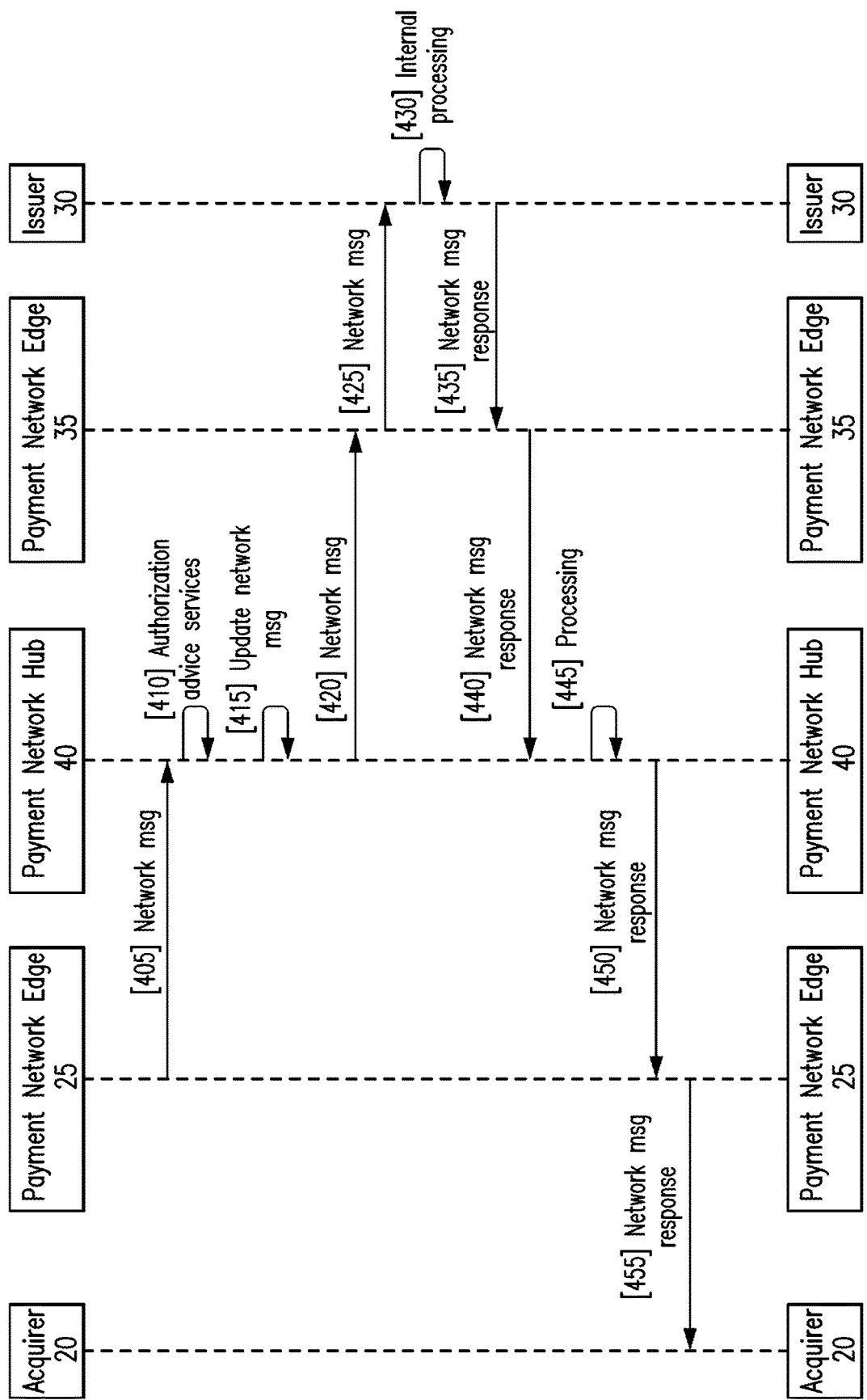
FIG. 4 shows an embodiment of a method for processing network transactions.

FIG. 4 shows operations which may be performed when, at 314, the payment network edge 25 of the acquirer 20 determines that the electronic payment request is for a transaction that does not support parallel processing. Examples of a transaction that does not support parallel processing include payment requests based on various types of tokenized card-based payments (e.g., Apple Pay, Android Pay, tokenization with apps, eCommerce tokenization, etc.). In a tokenization payment, a credit card or other type of account number may be represented as a token number. The payment network edge 25 of the acquirer 20 may determine that electronic payment requests based on these types of payments do not support parallel processing within the payment network.

Referring to FIG. 4, at 405, the payment network edge 25 of the acquirer 20 transmits the electronic payment request to the payment network hub 40. However, unlike operation 318, the payment network edge 25 does not transmit the payment request to the payment network edge 35 of the issuer 30.

At 410, the payment network hub 40 performs an assessment of the payment request, which may include performing various types of stand-in services. One example of a stand-in service may be fraud monitoring (with fraud risk or decline advice) but other types of stand-in services relating to authorization or other aspects of the transaction may also be performed.

At 415, the payment request may optionally be updated by the payment network hub 40 with information generated from the stand-in services or any other information considered pertinent to the issuer 30 in rendering a decision concerning whether to authorize the payment request.

At 420, the payment network hub 40 may transmit the payment request (updated or not) to the payment network edge 35 of the issuer 30.

At 425, the payment network edge 35 of the issuer 30 may transmit the payment request to the issuer 30.

At 430, the issuer 30 may perform an algorithm to generate a decision indicating determine whether the payment request should be approved or declined, for example, using the same algorithm as previously discussed.

At 435, the issuer 30 transmits a response message including the decision to the payment network edge 35 the issuer 30.

At 440, the payment network edge 35 of the issuer 30 transmits the response message including the decision to the payment network hub 40.

At 445, the payment network hub 40 may perform stand-in post-processing services, which, for example, include replacing the account number of the buyer with a token account number for maintaining security within the system.

At 450, the payment network hub 40 transmits the response message including the decision and the information inserted in operation 445 to the payment network edge 25 of the acquirer 20.

At 455, the payment network edge 25 of the acquirer 20 transmits the decision to the acquirer 20, which then outputs the decision to the buyer on the POS terminal, website, application, etc.

Thus, unlike the embodiments drawn to the parallel processing methods, when the payment request is not eligible for parallel processing in the payment network, all messages pass through the payment network hub 40. This processing of a transaction is significantly slower than the parallel processing methods.

Figure 5:
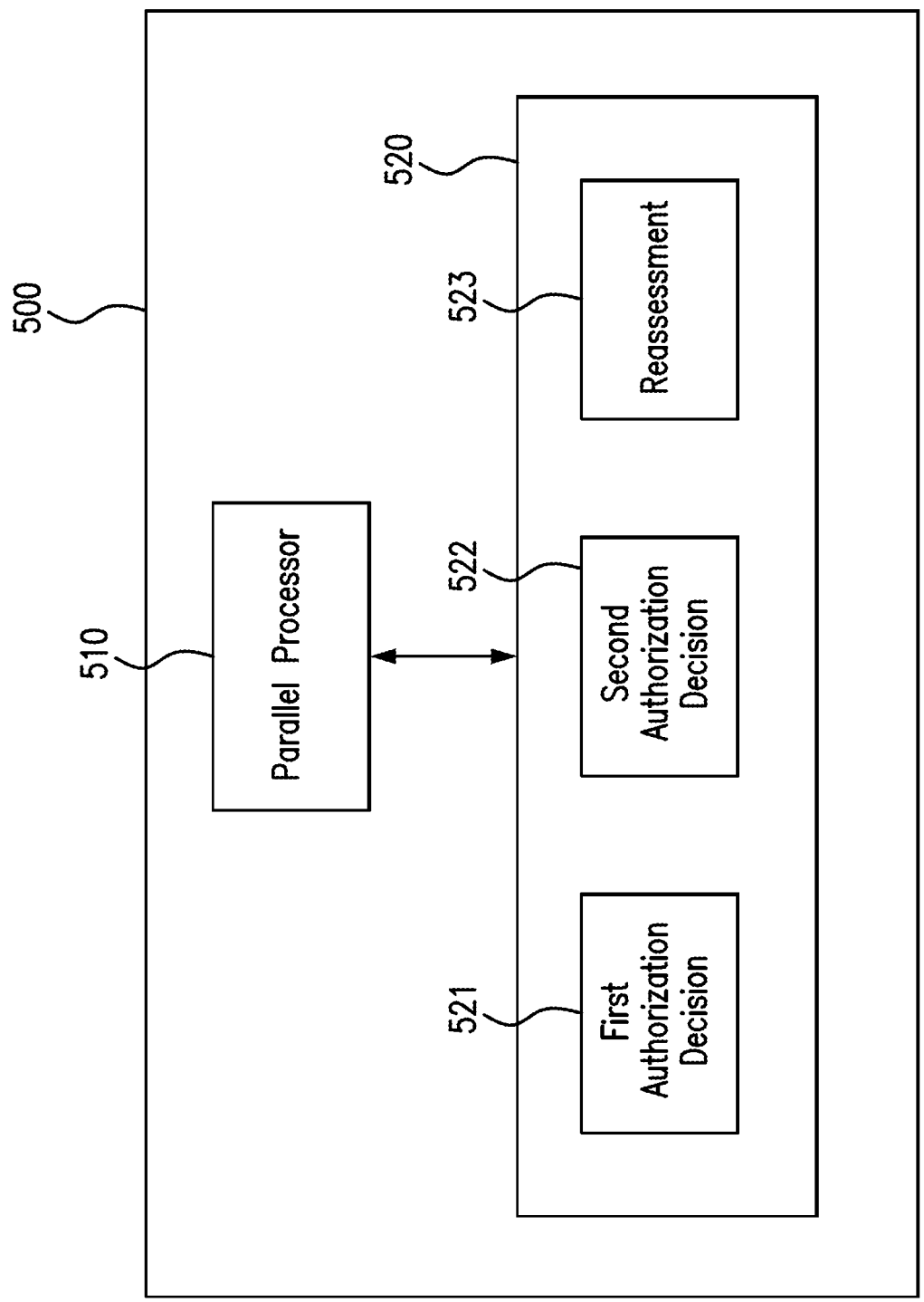
FIG. 5 shows an embodiment of a system for processing network transactions.

FIG. 5 shows an embodiment of a system 500 for processing transactions in a financial network. The system may be included in an network entity such as an acquirer as described herein or may be included in another entity within or coupled to the payment network.

Referring to FIG. 5, the system includes a parallel processor 510 coupled to a memory 520. The memory stores instructions which are to be executed by the parallel processor for implementing the features and embodiments described herein. In one embodiment, the instructions may include a first set of instructions 521 for determining the first authorization decision generated by the issuer 30, a second set of instructions 522 for determining the second authorization decision generated by the payment network edge 40, and one or more additional sets of instructions for comparing the authorization decisions. Based on the comparison (e.g., when the authorization decisions from the issuer 30 and payment network edge 40 do not match), the instructions may include a set of instructions 523 for updating the payment request and initiating reassessment of the initial authorization system by the issuer 30. The memory 520 may also include additional instructions for implementing the operations of the method embodiments.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors, logic, managers, systems, issuers, acquirers and other signal generating and signal processing features of the embodiments described herein may be implemented in non-transitory logic which, for example, may include hardware, software, or both. When implemented at least partially in hardware, the controllers, processors, logic, estimators, selectors, schedulers, prediction engines, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, logic, managers, systems, issuers, acquirers, and other signal generating and signal processing features may include, for example, a memory or other storage device for storing code or instructions to be executed, for example, by a computer, processor, microprocessor, controller, or other signal processing device. The controllers, processors, logic, managers, systems, issuers, acquirers, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the controllers, processors, logic, managers, systems, issuers, acquirers, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments described herein.

Any reference in this specification to an "embodiment" means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with features of one or more other embodiments described herein to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although a number of illustrative embodiments are described herein, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art. The embodiments may be combined to form additional embodiments.

We claim:

1. A network management system, comprising:
   a memory configured to store instructions; and
   a parallel processor configured to execute the instructions to:
   (a) receive an electronic request for a transaction from a computing device, the electronic request being for an electronic form of payment for the transaction;
   (b) determine, with a first entity, a first authorization decision for the electronic request based on a first payment processing and authorization process;
   (c) determine, with a second entity, a second authorization decision for the electronic request in parallel with the first authorization decision and based on a second payment processing and authorization process independent from the first payment processing and authorization process; and
   (d) determine whether the second authorization decision is the same as or different from the first authorization decision,
      in response to the second authorization decision being the same as the first authorization decision, maintaining the first authorization decision to bypass reassessment of the first authorization decision by the first entity, and
      in response to the first authorization decision being different from the second authorization decision, execute, with the first entity, a third payment processing and authorization process to reassess the first authorization decision based on additional data from the second entity, wherein the additional data is identified by the second entity when the second authorization decision is determined, wherein the additional data includes an identification of a test of the second payment processing and authorization process that was failed, and determine, with the first entity, a third authorization decision based on the third payment processing and authorization process, wherein the third authorization decision is different than the first authorization decision.

2. The system of claim 1, wherein:
   the first and third authorization decisions are generated by an issuer; and
   the second authorization decision is generated by a payment network hub.

3. The system of claim 2, wherein:
   the first authorization decision is different from the second authorization decision;
   the first authorization decision is an approval of the electronic request; and
   the second authorization decision is one of a decline or an alert for the electronic request.

4. The system of claim 1, wherein the parallel processor is configured to:
   transmit the electronic request to the first entity along a first signal path; and
   transmit the electronic request to the second entity along a second signal path,
   wherein the first signal path is independent from the second signal path to allow for the first authorization decision to be generated in parallel with generation of the second authorization decision.

5. The system of claim 1, wherein:
   the first authorization decision is the same as the second authorization decision;
   the first authorization decision is approval of the electronic request; and
   the second authorization decision is approval of the electronic request.

6. A method for managing a network, comprising:
   receiving an electronic request for a transaction authorization, the electronic request being for an electronic form of payment for the transaction;
   determining, with a first entity, a first authorization decision for the electronic request based on a first payment processing and authorization process;
   determining, with a second entity, a second authorization decision for the electronic request in parallel with the first authorization decision and based on a second payment processing and authorization process independent from the first payment processing and authorization process; and
   determining whether the second authorization decision is the same as or different from the first authorization decision,
      in response to the second authorization decision being the same as the first authorization decision, maintaining the first authorization decision to bypass reassessment of the first authorization decision by the first entity, and in response to the first authorization decision being different from the second authorization decision,
executing, with the first entity, a third payment processing and authorization process to reassess the first authorization decision based on additional data from the second entity, wherein the additional data is identified by the second entity when the second authorization decision is determined, wherein the additional data includes an identification of a test of the second payment processing and authorization process that was failed, and
determining, with the first entity, a third authorization decision based on the third payment processing and authorization process, wherein the third authorization decision is different than the first authorization decision.

7. The method of claim 6, further comprising:
transmitting the electronic request to the first entity along a first signal path; and
transmitting the electronic request to the second entity along a second signal path,
wherein the first signal path is independent from the second signal path to allow for the first authorization decision to be generated in parallel with generation of the second authorization decision.

8. The method of claim 6, wherein:
the first and third authorization decisions are generated by an issuer of an account; and
the second authorization decision is generated by a payment network hub.

9. The method of claim 8, wherein:
the first authorization decision is different from the second authorization decision;
the first authorization decision is an approval of the electronic request; and
the second authorization decision is one of a decline or an alert for the electronic request.

10. The method of claim 9, wherein the method is performed by an acquirer for the transaction placing the electronic request on the network via a payment network edge connection point.

11. The method of claim 10, wherein the payment network edge receives the first authorization decision and the second authorization decision in parallel from the issuer and the payment network hub, from which the payment network edge responds with a single consolidated decision.

12. The method of claim 6, wherein the third authorization decision is different from the first authorization decision.

13. The method of claim 6, wherein:
determining the first authorization decision is based on information received from an issuer in the network, and
determining the second authorization decision is based on information received from a payment network hub.

14. The method of claim 6, wherein:
the first authorization decision corresponds to a first fraud risk;
the second authorization decision corresponds to a second fraud risk; and
the first fraud risk is different from the second fraud risk.

15. The method of claim 6, further comprising:
performing a second procedure when the difference between the first authorization decision and the second authorization decision corresponds to a second state different from a first state associated with the first authorization decision.

16. The method of claim 15, wherein:
in the second state, the first authorization decision and the second authorization decision are approval decisions, and
the second procedure includes notifying a buyer of the transaction that the electronic payment has been approved.

17. The method of claim 6, further comprising:
the first authorization decision is the same as the second authorization decision;
the first authorization decision is approval of the electronic request; and
the second authorization decision is approval of the electronic request.

18. At least one non-transitory computer-readable storage medium comprising a set of executable program instructions, which when executed by a computing system, cause the computing system to:
receive an electronic request for a transaction authorization, the electronic request being for an electronic form of payment for the transaction;
determine, with a first entity, a first authorization decision for the electronic request based on a first payment processing and authorization process;
determine, with a second entity, a second authorization decision for the electronic request in parallel with the first authorization decision and based on a second payment processing and authorization process independent from the first payment processing and authorization process; and
determine whether the second authorization decision is the same as or different from the first authorization decision,
in response to the second authorization decision being the same as the first authorization decision, maintaining the first authorization decision to bypass reassessment of the first authorization decision by the first entity, and
in response to the first authorization decision being different from the second authorization decision,
execute, with the first entity, a third payment processing and authorization process to reassess the first authorization decision based on additional data from the second entity, wherein the additional data is identified by the second entity when the second authorization decision is determined, wherein the additional data includes an identification of a test of the second payment processing and authorization process that was failed, and
determine, with the first entity, a third authorization decision based on the third payment processing and authorization process, wherein the third authorization decision is different than the first authorization decision.

19. The at least one non-transitory computer-readable storage medium of claim 18, wherein:
the first authorization decision is different from the second authorization decision;
the first authorization decision is an approval of the electronic request; and
the second authorization decision is one of a decline or an alert for the electronic request.

20. The at least one non-transitory computer-readable storage medium of claim 18, wherein:
the first authorization decision is the same as the second authorization decision;

the first authorization decision is approval of the electronic request; and
the second authorization decision is approval of the electronic request.

\* \* \* \* \*